UNITED STATES PATENT OFFICE.

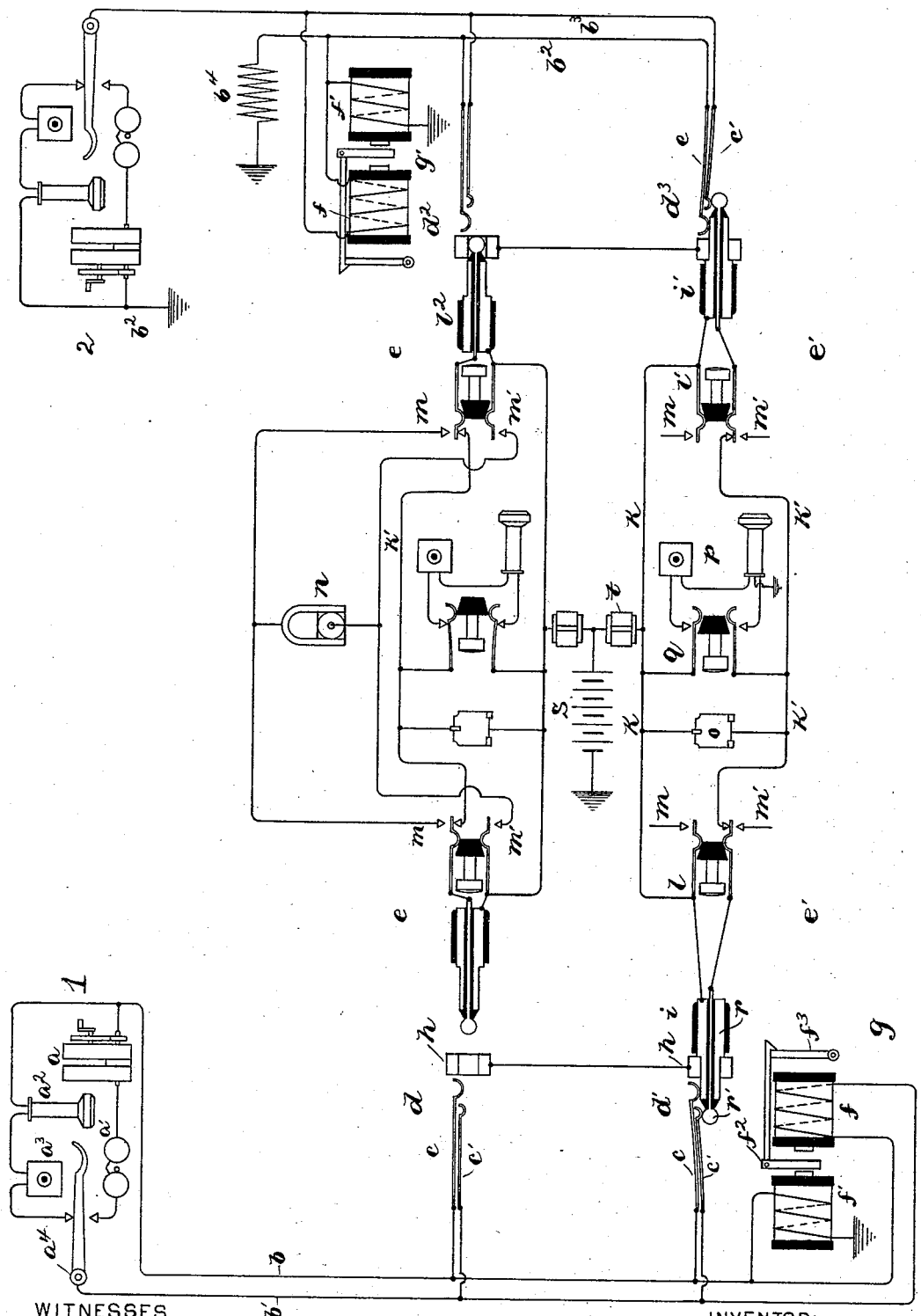

CHARLES E. SCRIBNER, OF CHICAGO, ILLINOIS, ASSIGNOR TO THE WESTERN ELECTRIC COMPANY, OF SAME PLACE.

MULTIPLE-SWITCHBOARD SYSTEM FOR TELEPHONE-EXCHANGES.

SPECIFICATION forming part of Letters Patent No. 488,035, dated December 13, 1892.

Application filed March 17, 1892. Serial No. 425,306. (No model.)

*To all whom it may concern:*

Be it known that I, CHARLES E. SCRIBNER, a citizen of the United States, residing at Chicago, in the county of Cook and State of Illinois, have invented a certain new and useful Improvement in Multiple-Switchboard Systems for Telephone-Exchanges, (Case No. 298,) of which the following is a full, clear, concise, and exact description, reference being had to the accompanying drawings, forming a part of this specification.

My invention relates to switchboard systems for telephone-exchanges, more specifically to apparatus and circuits for preventing the operation of the individual annunciators of connected lines by call-signals subsequent to the establishment of connection, and to suitable means for ascertaining at one switchboard whether a line is in use at some other switchboard or not.

The primary object of my invention is to provide means for automatically rendering the individual annunciator of a line inoperative when the connection is established with any spring-jack of a line without including any contact-points in the line-circuit, whereby the individual annunciator of an answering-line is prevented from releasing or actuating its indicator when a signal for disconnection or other similar purpose is sent from either of the sub-stations subsequent to the establishment of a connection.

A further object of my invention is to provide a test system normally wholly separated from the line-circuits and having no difference of potential between it and the earth, but adapted to be electrified by the same act and means by which the individual annunciator of the line is caused to be inoperative, whereby the mechanism of the exchange is made very simple and at the same time highly efficient. My improved exchange system may be used in connection with either metallic or grounded circuits, a condenser or resistance being inserted in each grounded branch at the exchange end to prevent the short-circuiting of the local battery.

My invention may be generally described as comprising spring-jacks, one for each line upon each section of switchboard, each spring-jack having three normally-insulated contact-pieces, two of which constitute the line-terminals or connecting-pieces, and the third of which constitutes a testing-piece or test-ring, an individual annunciator having two electro magnets or electro-magnetic helices, one of which performs the usual function of releasing or otherwise actuating a suitable indicator when energized, and the other of which is arranged to retain the indicator inoperative when energized, and a local circuit, including a source of electricity, adapted to be closed through the last mentioned helix or retaining-coil of the annunciator when a connection is made to any spring-jack of the line. The first-mentioned helix or operating-coil of the annunciator may be included in the usual manner in the line-circuit or in a branch therefrom. The retaining-coil is included in a branch circuit from one side of the line to earth. The connecting-plug for use in this system is provided with contacts arranged to make connection with the line-contacts of a spring-jack into which it may be inserted, and at the same time to cross together that line-contact which is connected to the retaining-coil of the annunciator with the testing of the spring-jack. A battery or other source of electricity is included in a branch connection to earth from that contact-piece of the plug which touches the test-ring. Thus in the normally-unconnected condition of the line the individual annunciator thereof is free to respond to signals from the sub-station of the line, but immediately upon the establishment of connection therewith, either to answer a call from its own sub-station or to establish connection with it from some other calling-line, the circuit of the said battery is closed to the corresponding line-contact of the line, and thence through the retaining-helix of the individual annunciator to earth, rendering the individual annunciator unresponsive to all subsequent signals. At the same time, since the battery is also crossed by a contact-piece of the connecting-plug to the test-ring of the spring-jack into which it is thrust, all the test-rings of the line are electrified to a difference of potential with the earth, and are in a condition to give a signal when tested with appropriate appliances. In establishing connection between telephone-line circuits two such connecting-plugs are used, like contact-pieces of the plugs being connected through conductors, one of the plugs being inserted into a spring-jack of the line from which the call is received and the other into a spring-jack of the line called for. Hence the individual annunciators of both lines are rendered inoperative during the continuance of the connection between them, and the test-rings of both lines are electrified so as to give the "busy" signal. A suitable apparatus is provided in connection with the plug-circuit to respond to signals from two subscribers in connection, as a signal for disconnection, to attract the attention of the attending operator.

My invention is illustrated in the accompanying drawings, in which I have shown two sub-stations, each connected by lines with two spring-jacks upon two sections of multiple switchboard and with an individual annunciator at one of the boards and with two pairs of plugs with their connecting-circuits and signaling appliances, the two lines being connected together for conversation by one of the plug-circuits. The other plug-circuit is shown in position for testing one of the lines.

The apparatus at the sub-station—for example, at sub-station 1—may be of the usual character, comprising signaling-generator $a$ and a signal-bell $a'$ and a telephone-receiver $a^2$ and transmitter $a^3$, connected to one side $b$ of the line-circuit, and a gravity-switch $a^4$, connected to the other side $b'$ of the line-circuit, arranged to connect the call apparatus or the telephone apparatus alternately into the line-circuit, according to the position of the switch. The lines $b\ b'$ extend to the exchange, where they are connected to the line-springs $c\ c'$, respectively, of two spring-jacks $d\ d'$ upon two sections of multiple switch-board $e\ e'$. A connection between the lines $b\ b'$ includes the operating-coil $f'$ of the individual annunciator $g$ upon the board $e'$. Branch connection from the line $b$ to earth includes the retaining-coil $f'$ of the annunciator $g$. The operation of this annunciator will be obvious at a glance. The pivoted armature $f^2$ is common to the two magnets $f$ and $f'$. It is provided with a catch adapted to release a pivoted shutter or indicator $f^3$ when attracted by the magnet $f$, but is prevented from moving toward magnet $f$ by the predominating attraction of magnet $f'$ when the latter is energized. Spring-jacks $d$ and $d'$ are provided with test-rings $h$, normally insulated from both the line-springs and connected together by a conductor.

The apparatus at sub-station 2 is of the same character as that at sub-station 1. The circuit therefrom to an exchange is shown as grounded, the branch $b^2$ being connected to earth at the sub-station and through a resistance $b^4$ at the exchange to earth. The lines $b^2\ b^3$ are connected to the two spring-jacks $d^2\ d^3$ upon the two sections of multiple switch-board $e\ e'$ and to the individual annunciator $g'$, situated upon the board $e$. The connecting outfit comprises the connecting-plugs $i\ i'$, each having two contact-pieces, the like contact-pieces of the two plugs being connected together by the conductors $k\ k'$. Two calling-keys $l\ l'$ are shown in connection with the conductors joining the two plugs, each of which is adapted to disconnect the tip of one of the plugs from that of the other and to connect the two terminals $m\ m'$ of the calling-generator $n$ to the two contact-pieces of the plugs when its plunger is depressed. Thus when the key is operated the calling-generator $n$ is looped into the line with which the plug is connected, the sleeve of the plug remaining still connected to the retaining-battery. A clearing-out annunciator $o$ is provided in a bridge connection between the conductors $k\ k'$ and an operator's telephone set $p$ in connection with a listening-key $q$, arranged to connect the operator's telephone, and also in a bridge connection between the conductors $k\ k'$ when its plunger is depressed. An earth connection is attached to the middle of the operator's telephone-coil for testing purposes. The sleeve-strand $r$ of the connecting-plug in this instance makes contact with the line-spring $c$, which is connected to the retaining-coil $f'$ of the individual annunciator, and to the conductor $k$, connected with this contact-piece of the plug, is attached a battery $s$, a retardation-coil $t$ being included in the branch between the battery and the conductor $k$, in order that a large number of plug-circuits may be connected to a common battery without becoming injuriously crossed together.

Suppose that the subscriber at sub-station 1 desires to communicate with subscriber at station 2. The switch $a^4$ being down, he operates the calling-generator $a$, sending current over lines $b\ b'$, which finds circuit through the operating-coil $f$ of the individual annunciator $g$, thereby operating the annunciator and attracting the attention of the attendant operator at board $e'$ to the line of subscriber calling. The operator thereupon inserts a connecting-plug $i$ into the spring-jack $d'$ of that line at her board and depresses the plunger of key $q$, thereby connecting her telephone-set $p$ to the calling-line. The battery $s$ is now provided with a circuit through the retardation-coil $t$ and conductor $k$ to sleeve of plug $i$, thence to the spring $c$ of the jack $d'$, and thence through the retaining-coil $f'$ of the individual annunciator $g$ to earth. The individual annunciator is thus rendered inoperative, and will fail to respond to all signals while the connection exists. At the same time the test-pieces $h$ of the different jacks of line to sub-station 1 are electrified by contact with the sleeve $r$ of the plug, and are in a condition to give a "busy" response to a test at any one of the switchboards. The operator having depressed the plunger of key $q$, thereby connecting her telephone set $p$ in a bridge connection between the conductors $k\ k'$, is thus in communication with the subscriber at station 1 over circuit which may be traced as follows: From station 1 over line $b$ to spring $c$ of jack $d'$, thence to the sleeve of plug $i$ to conductor $k$, through the key $q$ and telephone-set $p$ to conductor $k'$, thence returning through the contacts of calling-key $l$ to the tip $r$ of the plug $i$ to the line-springs $c'$ of jack $d'$, and thence over line $b'$ to sub-station. Having learned with what line subscriber at station 1 desires connection, the operator at board $e'$ proceeds to test the spring-jack of the line wanted at her board $e'$. This she does by the well-known process of applying the tip of her connecting-plugs $i'$ to the test-piece or test-ring $h$ of the spring-jack. The plug $i^2$ of the plug-circuit at the board $e$ is shown in the position of making such a test of jack $d^2$ of this same line. If a connection already exists to some other spring-jack of the line, as is actually the case in the drawing, the test-battery $s$ will be connected, as described, to the group of test-rings $h$ of this line. Current will find circuit to the tip of plug $i^2$, through the conductor $k'$, through the operator's telephone-set to the middle of the coil of the receiver, and thence to earth, whereby a click will be produced in the telephone-receiver which will be interpreted by the operator testing as an indication that the line is already in use. If, however, the line were not in use, the test-rings $h$ of the line would be insulated, and no test-current could by any possibility reach the telephone-receiver when a test was made. Thus the occurrence of a click in the receiver at each application of the testing-plug to the test-ring of the spring-jack is a certain indication to the operator that the line tested is in use. Assume, however, that the lines to station 2 were not in use, the operator at board $e'$ establishes connection between sub-stations 1 and 2 by inserting the connecting-plug $i'$, with which she has been testing entirely into the jack $d^3$. The telephone-lines are thus included in a continuous circuit, which may be traced from sub-station 1 over lines $b\ b'$ to the contact-pieces $r\ r'$ of plug $i$, thence through the cord-circuit to the corresponding contact-pieces of the plug $i'$, thence to springs $c\ c'$ of jack $d^3$, thence over line $b^2$ through resistance $b^4$ and earth, and over line $b^3$, respectively, to sub-station 2. The operator then depresses the plunger of ringing-key $l'$, connecting the two contact-pieces of the spring-jack $d^3$ to the poles $m\ m'$ of the calling-generator, thus sending calling-current to sub-station 2 to operate the signal-bell thereat. It will be noted that from the moment of the insertion of the plug $i'$ into the jack $d^3$ the battery $s$ is provided with an additional circuit through the conductor $k$ to the sleeve of the plug, thence to line-spring $c$ of the jack, thence by conductors through the coil $f'$ of the individual annunciator $g'$ to earth, and the annunciator $g'$ of lines to sub-station 2 is also rendered inoperative. The function of the resistance $b^4$ between the conductor $b^2$ and earth is to prevent the battery $s$ from being short-circuited or connected directly to earth. If desired, the resistance-coil $b^4$ may be replaced by a condenser of suitable capacity to transmit the alternating telephonic signaling-currents. The operator, having determined by listening at her telephone-circuit that the subscribers are actually in communication, allows the plunger of her listening-key $q$ to rise, thus disconnecting her telephone. When the communicating subscribers have completed their conversation, one of them sends a signaling-current from his generator, which passes over his telephone lines to the line-contacts of the spring-jacks, thence through the corresponding contact-pieces of the plug to the conductors $k\ k'$, and thence through the clearing-out annunciator $o$, which is thereby operated and notifies the attending operator that the connection is no longer desired. She proceeds to disconnect the lines by removing the plugs $i\ i'$ from the spring-jacks thereof. A portion of the signaling-current finds circuit through the coil $f$ of the individual annunciator of the signaling-line and still another portion through the cord-circuit to the lines of the other subscriber and through the operating-coil of the individual annunciator of that line; but on account of the predominating attraction of the coils $f'$ of both the individual annunciators neither of them would be operated.

I have sometimes found it desirable to employ self-restoring individual annunciators, such as that described in my application, Case No. 252, Serial No. 430,310, filed February 4, 1892. In the annunciator therein described two coils—an operating-coil and a restoring or retaining coil—are provided, the former adapted to actuate the indicator when energized and the latter adapted to restore the indicator to its normal position when energized and to retain it in such position during the continuance of its magnetization. When such an annunciator is employed in connection with my exchange-system herein described, the operating-coil is included in circuit between the lines, as herein described, and the restoring-coil is included in the branch between one side of the line and earth in place of retaining-coil herein described. The battery $s$ then performs the additional function of resetting or restoring the individual annunciator as soon as a connecting-plug is inserted into the spring-jack of the lines. The manner of effecting this will be obvious to one skilled in the art, and I do not deem further description necessary.

Having thus described my invention, I claim as new and desire to secure by Letters Patent—

1. The combination, with a line-circuit extending from a sub-station to a central station, of an individual annunciator at the central station having two coils adapted to act differentially or oppositely through suitable mechanism upon an indicator, one of said coils being included in the said telephone-line circuit and the other being included in a branch from one side thereof to earth, substantially as described.

2. The combination, with a telephone-line extending from a sub-station to a central station, of an individual annunciator at the central station provided with two coils adapted to act differentially or oppositely upon an indicator, one of said coils being included in the said line-circuit and the other being included in a branch therefrom to earth, and means for connecting a grounded source of electricity to that side of line to which the grounded coil is attached, substantially as described.

3. In combination with a telephone-line circuit, spring-jacks, each having two contact-pieces connected to the different sides of line, respectively, an individual annunciator having two electro-magnets adapted to act oppositely or differentially upon indicating mechanism, one of said electro-magnets being included in said line-circuit and the other being included in a branch from one side of said line to earth, and a connecting-plug adapted for insertion into a spring-jack of the line and having a contact-piece connected to one terminal of a source of electricity whose other terminal is connected to earth adapted to make contact with that line-contact which is connected through a coil of the annunciator to earth, substantially as described.

4. The combination, with a telephone-line circuit extending from a sub-station to an exchange, of spring-jacks at the exchange, each having two contact-pieces connected to the different sides of the line-circuit, respectively, an individual annunciator having two electro-magnets, one being included in the line-circuit and arranged to actuate a suitable indicator when energized and the other being included in a branch from one side of the line-circuit and arranged to prevent the operation of said indicator when energized, a connecting-plug having two contact-pieces adapted to make contact with the line-contacts of a spring-jack, respectively, and a source of electricity having one of its terminals grounded and the other connected to that contact-piece of the plug which connects with the said grounded coil, substantially as described.

5. The combination, with a telephone-line circuit extending from a sub-station to a central station, of spring-jacks at the central station, each having two contact-pieces connected to the two sides of line, respectively, an individual annunicator having two electro-magnets, one included in the line-circuit, adapted to actuate a suitable indicator when energized and the other included in a branch from one side of the line to earth and arranged to prevent the actuation of said indicator when energized, a connecting-plug having two contact-pieces making connection with the two line-contacts of a spring-jack, respectively, a source of electricity having one of its terminals connected to that contact-piece of the connecting-plug which connects with the grounded coil of the annunciator and its other terminal connected to earth, and a clearing-out annunciator included in a conductor joining the different contact-pieces of the plug, substantially as described.

6. In combination with a telephone-line extending from a sub-station to a central station, spring-jacks at the central station, each having three insulated contact-pieces, two of said contact-pieces being connected to the two sides of the line-circuit, respectively, and the remaining contact-pieces of all the jacks being connected together, an individual annunciator having two electro-magnets arranged to act differentially upon a suitable indicating mechanism, one of said electro-magnets being included in the line-circuit and the other in a branch from one side of the line-circuit to earth, a connecting-plug having two contact-pieces, one adapted to make contact with one of the line-contacts of the jack and with the extra contact or test ring and the other adapted to make contact with the remaining line-spring of the spring-jack, and a source of electricity having one of its terminals connected to that contact-piece of the connecting-plug which touches the test-ring of the jack and its other terminal connected to ground, substantially as described.

7. In combination, two telephone-lines extending from a sub-station to a central station, two groups of spring-jacks, each spring-jack having two contact-pieces connected to the different sides of one of the lines, two individual annunciators, each having two coils arranged to act oppositely upon a common armature, one of said magnets of each annunciator being included in its particular line-circuit and the other being included in a branch from one side of its particular line to earth, a connecting-plug in a spring-jack of each line, each plug having two contact-pieces making contact with the two line-contacts of the spring-jack, respectively, conductors joining like contact-pieces of the two plugs, a clearing-out annunciator in circuit between the different contact-pieces of the plugs, and a source of electricity having one of its terminals connected to the ground and the other connected to the conductor joining those contact-pieces of the two plugs which make connection to the grounded coils of the individual annunciators, whereby the individual annunciators of two connected lines are rendered unresponsive to subsequent signaling-currents and the clearing-out annunciator is connected with the lines to respond to such subsequent signals, substantially as described.

In witness whereof I hereunto subscribe my name this 16th day of February, A. D. 1892.

CHARLES E. SCRIBNER.

Witnesses:
F. R. McBERTY,
GEORGE L. CRAGG.